US009781104B2

(12) United States Patent
Lu et al.

(10) Patent No.: US 9,781,104 B2
(45) Date of Patent: Oct. 3, 2017

(54) WORKING METHOD OF DYNAMIC TOKEN

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 11 days.

(21) Appl. No.: 14/777,768

(22) PCT Filed: Mar. 18, 2014

(86) PCT No.: PCT/CN2014/073602
§ 371 (c)(1),
(2) Date: Sep. 17, 2015

(87) PCT Pub. No.: WO2014/183500
PCT Pub. Date: Nov. 20, 2014

(65) Prior Publication Data
US 2016/0301687 A1    Oct. 13, 2016

(30) Foreign Application Priority Data

May 15, 2013  (CN) .......................... 2013 1 0179870
Sep. 9, 2013  (CN) .......................... 2013 1 0404877

(51) Int. Cl.
*G06F 21/00*     (2013.01)
*H04L 29/06*    (2006.01)
(Continued)

(52) U.S. Cl.
CPC ........ *H04L 63/0838* (2013.01); *G06F 21/335* (2013.01); *H04L 9/3228* (2013.01);
(Continued)

(58) Field of Classification Search
CPC ............................... G06F 21/335; H04L 63/08
(Continued)

(56) References Cited

U.S. PATENT DOCUMENTS

2013/0024932 A1   1/2013  Toebes et al.
2014/0380445 A1*  12/2014 Tunnell .................. G06F 21/00
                                                                726/7
2016/0164725 A1*  6/2016  Wu ...................... H04L 41/0803
                                                                713/168

FOREIGN PATENT DOCUMENTS

CN    102611556 A    7/2012
CN    103023643 A    4/2013
(Continued)

OTHER PUBLICATIONS

International Search Report (English and Chinese) and Written Opinion of the ISA (Chinese) ISA/CN, Beijing, mailed Jun. 20, 2014.

*Primary Examiner* — Anthony Brown
(74) *Attorney, Agent, or Firm* — Harness, Dickey & Pierce, P.L.C.

(57) ABSTRACT

Disclosed is a working method of a dynamic token. The present invention relates to the field of communications. The method comprises: when a token is awakened, the awakening identification type at a flag bit is determined; if the type is a key awakening identification, the key value is detected, and a corresponding operation is performed according to the key pressed; if the type is a Bluetooth data awakening identification, Bluetooth data is received, and when the Bluetooth data has been received, the Bluetooth data is stored in a received data temporary storage region, and the Bluetooth data awakening identification is reset; if the type is Bluetooth connection awakening identification, that Bluetooth has been connected is displayed, and after fourth preset period has passed, the screen is cleared, and the
(Continued)

Bluetooth connection awakening identification is reset; if the type is Bluetooth disconnection awakening identification, that Bluetooth has been disconnected is displayed, the received data temporary storage region is cleared, and the Bluetooth disconnection awakening identification is reset; and if the type is an awakening identification of other types, a corresponding operation according to the awakening identification is performed.

23 Claims, 6 Drawing Sheets

(51) Int. Cl.
*H04L 9/32* (2006.01)
*G06F 21/33* (2013.01)
*H04W 12/06* (2009.01)
*H04W 4/00* (2009.01)
*H04W 84/18* (2009.01)

(52) U.S. Cl.
CPC ........... *H04L 63/067* (2013.01); *H04W 4/008* (2013.01); *H04W 12/06* (2013.01); *G06F 2221/2141* (2013.01); *G06F 2221/2147* (2013.01); *H04W 84/18* (2013.01)

(58) Field of Classification Search
USPC .......................................................... 726/6
See application file for complete search history.

(56) References Cited

FOREIGN PATENT DOCUMENTS

| | | |
|---|---|---|
| CN | 103312508 A | 9/2013 |
| CN | 103457741 A | 12/2013 |

* cited by examiner

WORKING METHOD OF DYNAMIC TOKEN

CROSS-REFERENCE TO RELATED APPLICATIONS

This application is a 371 U.S. National Stage of International Application No. PCT/CN2014/073602, filed on Mar. 18, 2014, which claims priority to Chinese patent application titled "WORKING METHOD OF DYNAMIC TOKEN", with Application Number of 201310404877.2 and filed with the Chinese Patent Office on Sep. 9, 2013, and Chinese patent application entitled "WORKING METHOD OF DYNAMIC TOKEN" with Application Number of 201310179870.5 and filed with the Chinese Patent Office on May 15, 2013, which are both hereby incorporated by reference in entirety.

TECHNICAL FIELD

The present disclosure relates to identity authentication field, and more particularly, to a working method of a dynamic token.

BACKGROUND

The greatest advantage of a dynamic token is preventing an identity of a legal user from being counterfeited by a law-breaker because passwords used by a user are varied from time to time. Dynamic password verification technology is regarded as one of the best effective ways to verify a user identity at present, which can avoid network problems, such as user account password being stolen by hackers or Trojans, fake websites, etc., and preventing the user from losing properties or data.

Compared with a conventional dynamic token, a dynamic token whose dynamic password is generated with attendance of information input by a user has higher security. At present, the dynamic token, whose dynamic password is generated with attendance of information input by a user, has a keyboard; and the user information is input by the user through the keyboard of the dynamic token.

In the process of implementing the present disclosure, the applicant finds that when a large amount of information is required to be input, a speed of manual input of user information is low, an error rate is high and the input error data are not easy to be detected and modified, which wastes the user's time and brings unnecessary troubles as well.

SUMMARY OF THE DISCLOSURE

In order to address problems in the prior art, the present disclosure provides a working method of a dynamic token, comprising:

Step S1, determining, by the dynamic token, whether a set wake identification exists, if the set wake identification exists, Step S2 is executed; if the set wake identification does not exist, the dynamic token is sleeping;

Step S2, determining, by the dynamic token, a type of the set wake identification, Step S3 is executed if the set wake identification is a key wake identification; switching a work mode of a Bluetooth module into a monitoring mode, resetting a Bluetooth connection wake identification and going back to Step S1 if the set wake identification is the Bluetooth connection wake identification; receiving Bluetooth data, storing the Bluetooth data into a data receiving buffer, setting a Bluetooth data receiving completion identification, resetting a Bluetooth data wake identification and going back to Step S1 if the set wake identification is the Bluetooth data wake identification; clearing the data receiving buffer, resetting a Bluetooth disconnection wake identification and going back to Step S1 if the set wake identification is the Bluetooth disconnection wake identification; wherein the key wake identification is configured to be set by the dynamic token in a case that the dynamic token detects key interrupt; the Bluetooth data wake identification is configured to be set by the dynamic token in a case that the token detects Bluetooth data interrupt; the Bluetooth connection wake identification is configured to be set by the dynamic token in a case that the dynamic token detects Bluetooth connection interrupt; the Bluetooth disconnection wake identification is configured to be set by the dynamic token in a case that the dynamic token detects Bluetooth disconnection interrupt;

Step S3, obtaining, by the dynamic token, a key value of a triggered key, determining upon the key value whether the triggered key is a power key, executing Step S4 if the triggered key is a power key; executing Step S5 if the triggered key is not a power key;

Step S4, determining, by the dynamic token, whether a system state identification is a power-off identification;

determining whether a work voltage of the Bluetooth module is lower than a preset voltage, if the system state identification is a power-off identification; prompting that the work voltage of the Bluetooth module is low if the work voltage of the Bluetooth module is lower than the preset voltage, and setting the system state identification as a challenge code input identification and executing Step S8, after the working voltage of the Bluetooth module has been lower than the preset voltage for a first preset time; powering up the Bluetooth module, setting the system state identification as a Bluetooth OTP identification, switching the work mode of the Bluetooth module into a monitoring mode and executing Step S8, if the work voltage is not lower than the preset voltage;

setting the system state identification as a power-off identification, clearing data in a key data buffer, powering off the Bluetooth module and executing Step S8, if the system state identification is not the power-off identification;

Step S5, determining, by the dynamic token, the system state identification, executing Step S6 if the system state identification is the challenge code input identification; executing Step S7 if the system state identification is the Bluetooth OTP identification; executing Step S8 executed if the system state identification is an else identification;

Step S6, obtaining, by the dynamic token, a key value of a triggered key, determining the triggered key upon the key value;

storing a number corresponding to the key value in the key data buffer and executing Step S8, if the triggered key is a number key;

determining whether data exist in the key data buffer if the triggered key is an OK key; taking the data in the key data buffer as a dynamic factor or taking a combination of the data in the key data buffer and a basic factor inside the dynamic token as a dynamic factor, computing a dynamic password upon the dynamic factor, displaying the dynamic password and executing Step S8, if data exist in the key data buffer; taking the basic factor as dynamic factor, computing the dynamic password upon the dynamic factor, displaying the dynamic password, and executing Step S8, if no data exist in the key data buffer;

clearing data in the key data buffer and executing Step S8 if the triggered key is a Delete key;

Step S7, obtaining, by the dynamic token, a key value of a triggered key, determining the triggered key upon the key value;

storing the number corresponding to the key value in the key data buffer and executing Step S8, if the triggered key is number key;

determining whether the Bluetooth data receiving completion identification is set if the triggered key is an OK key; taking the data in the data receiving buffer as the dynamic factor or taking a combination of the basic factor and the data in the data receiving buffer as the dynamic factor, computing the dynamic password upon the dynamic factor, returning the computed dynamic factor to an upper computer and executing Step S8, if the Bluetooth data receiving completion identification is set; determining whether data exist in the key data buffer if the Bluetooth data receiving completion identification is not set; taking the data in the key data buffer as the dynamic factor or a combination of the data in the key data buffer and the basic factor inside the token as the dynamic factor, computing the dynamic password according to the dynamic factor, displaying the dynamic factor and executing Step S8 if data exist in the key data buffer; taking the basic factor as the dynamic factor, computing the dynamic password upon the dynamic factor, returning the computed dynamic password to an upper computer and executing Step S8 if no data exist in the key data buffer;

storing the system state identification as a challenge code input identification and executing Step S8 if the triggered key is a Delete key;

And step S8, resetting, by the dynamic token, the key wake identification, going back to Step S1.

Returning the computed dynamic password to an upper computer comprises displaying the dynamic password via a LCD screen and/or returning the dynamic password to the upper computer via the Bluetooth module.

In Step S4, before the determining whether a work voltage of the Bluetooth module is lower than a preset voltage, the method further comprises: performing a password checking operation; determining whether a work voltage of the Bluetooth module is lower than a preset voltage if the password is correct; executing Step S8 if the password is not correct;

the performing a password checking operation comprises:

Step E1, obtaining, by the dynamic token, a key value of the triggered key, determining the triggered key upon the key value; executing Step E2 if the triggered key is an OK key; storing key data corresponding to the number key in a key data buffer, displaying a password checking interface, and quitting the password checking operation, if the triggered key is a number key and a length of the key data is shorter than a preset length; performing a corresponding operation upon an else key value and quitting the password checking operation if the triggered key is the else key;

Step E2, determining whether the password in the key data buffer is correct, executing Step E3 if the password is correct; executing Step E4 if the password is not correct;

Step E3, prompting that the password is correct, clearing password failure times, delaying a fourth preset time, clearing the key data buffer, determining that the password is correct and ending the password checking operation;

Step E4, adding 1 to the number of the password failure times, displaying a password failure interface, delaying the fourth preset time and executing Step E5;

Step E5, determining whether the number of the password failure times is equal to the number of preset times;

clearing the key data buffer, determining that the password is not correct and executing Step S8, if the number of the password failure times is equal to the number of the preset times; displaying the password input interface, clearing the key data buffer and executing Step S8, if the number of the password failed times is not equal to the number of the preset times.

In Step S6, the clearing data in the key data buffer and executing Step S8, if the triggered key is a Delete key, comprises:

Step A1, determining whether a duration of pressing down the Delete key reaches a preset duration; executing Step A2 if the duration of pressing down the Delete key reaches the preset duration; executing Step A5 if the duration of pressing down the Delete key does not reach the preset duration;

Step A2, determining whether data exist in the key data buffer; executing Step A4 if the data exist in the key data buffer; executing Step A3 if no data exist in the key data buffer;

Step A3, displaying a menu interface, storing the system state identification as a menu function selection identification and executing Step S8;

Step A4, clearing the key data buffer, displaying a challenge code information input interface and executing Step S8;

Step A5, determining whether data exist in the key data buffer; executing Step A6 if the data exist in the key data buffer; executing Step A7 if no data exist in the key data buffer;

Step A6, clearing a last stored key value in the key data buffer and executing Step A7;

Step A7, displaying the challenge code information input interface, displaying the data in the key data buffer and executing Step S8;

Step S5 further comprises detecting a system state identification, performing a menu function selection operation and executing Step S8 if the system state identification is a menu function selection identification; the menu function selection operation comprises:

Step H1, detecting a key value; executing Step H2 if the key value is a value of an OK key; performing a corresponding operation upon an else key value and quitting the menu function selection operation, if the key value is the else key value, where the else key value comprises a key value of a Right key and a key value of a Left key;

Step H2, determining a selected function; executing Step H3 if the selected function is Bluetooth OTP; performing a corresponding function selection operation and quitting the menu function selection operation, if the selected function is an else function;

Step H3, powering up the Bluetooth module, displaying a Bluetooth OTP interface, storing the system state identification as a Bluetooth OTP identification and executing Step H4;

Step H4, reading a Bluetooth module parameter;

Step H5, determining whether the reading the Bluetooth module parameter is successful; if the reading the Bluetooth module parameter is successful, executing Step H6; if the reading the Bluetooth module parameter is not successful, executing Step H7;

Step H6, switching the Bluetooth module into a monitoring mode and quitting the menu function selection operation;

Step H7, adding 1 to the times of reading the Bluetooth module parameter;

Step H8, determining whether the number of the times of reading the Bluetooth module parameter reaches a sixth preset value; executing Step H9 if the number of the times of reading the Bluetooth module parameter reaches the sixth preset value; going back to Step H4 if the number of the times of reading the Bluetooth module parameter does not reach the sixth preset value;

Step H9, prompting that the Bluetooth module is broken; powering off the Bluetooth module, delaying a third preset time, displaying a challenge code information input interface, storing the system state identification as a challenge code input identification and quitting the menu function selection operation.

The basic factor is a time factor, the method further comprises:

updating, by the dynamic token, the time factor and setting a timer wake identification in a case that timer interrupt is detected;

after determining that the set wake identification is the timer wake identification, the dynamic token executes following Steps:

Step G1, determining whether the system state identification is a Bluetooth OTP identification;

if the system state identification is a Bluetooth OTP identification, adding 1 to a count value of a Bluetooth mode counter and executing Step G2; if the system state identification is not a Bluetooth OTP identification, executing Step G7;

where an initial count value of the Bluetooth mode counter is 0;

Step G2, determining whether the count value of the Bluetooth mode counter is less than a first preset value;

executing Step G4 if the count value of the Bluetooth mode counter is less than the first preset value; executing Step G3 if the count value of the Bluetooth mode counter is not less than the first preset value;

Step G3, setting the count value of the Bluetooth mode counter as 0, clearing the data receiving buffer, powering off the Bluetooth module, displaying the challenge code information input interface, storing the system state identification as a challenge code input identification and executing Step G6;

Step G4, detecting whether a work voltage of the Bluetooth module is lower than a preset voltage, executing Step G5 if the work voltage is lower than the preset voltage; executing Step G6 if the work voltage is not lower than the preset voltage;

Step G5, setting the count value of the Bluetooth mode counter as 0, clearing the data receiving buffer, powering off the Bluetooth module, displaying the challenge code information input interface, storing the system state identification as a challenge code input identification, outputting prompting information that work voltage is low and please use Bluetooth function after recharging through LCD screen, and executing Step G6;

Step G6, determining whether the system state identification is a challenge code input identification; if the system state identification is a challenge code identification, executing Step G7; otherwise, executing Step G10;

Step G7, adding 1 to a count value of a no-key-press counter;

where an initial value of the no-key-press counter is 0;

Step G8, determining whether the count value of the no-key-press counter is less than a second preset value;

executing Step G10 if the count value of the no-key-press counter is less than the second preset value; executing Step G9 if the count value of the no-key-press counter is not less than the second preset value;

Step G9, setting the count value of the no-key-press counter as 0, storing the system state identification as a power-off identification, clearing the key data buffer and executing Step G10;

Step G10, resetting the timer wake identification and going back to Step S1.

The basic factor comprises a time factor and/or an event factor.

A working method of a dynamic token, comprising:

initializing the dynamic token, enabling key interrupt and/or Bluetooth data interrupt and/or Bluetooth connection interrupt and/or Bluetooth disconnection interrupt, the dynamic token sleeping;

in a case that the dynamic token detects key interrupt, the dynamic token being woken up and executing Step S-1;

Step S-1, obtaining, by the dynamic token, a key value of a triggered key, determining whether the triggered key is a power key upon the key value; executing Step S-2 if the triggered key is a power key; detecting a system state identification if the triggered key is not a power key; executing Step S-3 if the system state identification is a challenge code input identification; executing Step S-4 if the system state identification is a Bluetooth OTP identification; the dynamic token sleeping if the system state identification is an else identification;

Step S-2, determining whether the system state identification is a power-off identification, determining whether a work voltage of the Bluetooth module is lower than a preset voltage if the system state identification is a power-off identification; prompting that the work voltage of the Bluetooth module is low if the work voltage of the Bluetooth module is lower than the preset voltage, storing the system state identification as a challenge code input identification after the work voltage of the Bluetooth module has been lower than the preset voltage for a first preset duration and the dynamic token sleeping; powering up the Bluetooth module if the work voltage is not lower than the preset voltage, storing the system state identification as a Bluetooth OTP identification, switching a work mode of the Bluetooth module into a monitoring mode and the dynamic token sleeping;

storing the system state identification as a power-off identification if the system state identification is not a power-off identification, clearing the data in the key data buffer, powering off the Bluetooth module and the dynamic token sleeping;

Step S-3, obtaining, by the dynamic token, a key value of a triggered key, determining the triggered key upon the key value; storing a number corresponding to the key value into a key data buffer if the triggered key is a number key, and the dynamic token sleeping; determining whether data exist in the key data buffer if the triggered key is an OK key; taking the data in the key data buffer or taking a combination of the data in the key date buffer and a basic factor inside the dynamic token as a dynamic factor, computing a dynamic password upon the dynamic factor and displaying the dynamic password, and the dynamic token sleeping, if the data exist in the data buffer; taking the basic factor as dynamic factor and computing dynamic password upon the dynamic factor, displaying the dynamic password and the dynamic token sleeping, if the data does not exist in the data buffer; clearing the data in the key data buffer and the dynamic token sleeping, if the triggered key is a Delete key;

Step S-4, obtaining, by the dynamic token, a key value of a triggered key, determining the triggered key upon the key value;

storing the number corresponding to the key value in the key data buffer and the dynamic token sleeping if the triggered key is a number key;

determining whether a Bluetooth data receiving completion identification is set if the triggered key is an OK key; taking the data in the data receiving buffer or taking combination of the basic factor and the data in the data receiving buffer as the dynamic factor, computing the dynamic password according to the dynamic factor, returning the obtained dynamic password to an upper computer, and the dynamic token sleeping, if the Bluetooth data receiving completion identification is set; determining whether the data exist in the key data buffer if the Bluetooth data receiving completion identification is not set; taking the data in the key data buffer or taking the combination of the data in the key data buffer and the basic factor inside the dynamic token as the dynamic factor, computing the dynamic password according to the dynamic factor, displaying the dynamic password, and the dynamic token sleeping, if the data exist in the key data buffer; taking the basic factor as the dynamic factor, computing the dynamic password according to the dynamic factor, returning the obtained dynamic password to the upper computer and the dynamic token sleeping, if no data exist in the key data buffer;

storing the system state identification as a challenge code input identification and the dynamic token sleeping, if the triggered key is a Delete key;

in a case that the dynamic token detects the Bluetooth data interrupt, receiving the Bluetooth data, storing the Bluetooth data in the data receiving buffer till receiving of the Bluetooth is completed, setting a Bluetooth data receiving completion identification and the dynamic token sleeping;

in a case that the dynamic token detects the Bluetooth connection interrupt, displaying that Bluetooth is connected, clearing the screen after a preset time and the dynamic token sleeping;

in a case that the dynamic token detects the Bluetooth disconnection interrupt, clearing the data receiving buffer and the dynamic token sleeping;

where the basic factor comprises a time factor and/or an event factor.

Before determining whether the work voltage of the Bluetooth module is lower than the preset voltage in Step S-2, the method further comprises performing a password checking operation; determining whether a work voltage of the Bluetooth module is lower than a preset voltage if the password is correct; the dynamic token sleeping if the password is not correct;

the password checking operation comprises:

Step E1, obtaining, by the dynamic token, a key value of a triggered key, determining the triggered key upon the key value; executing Step E2 if the triggered key is an OK key; storing key data corresponding to the number key and storing the key data in the key data buffer, displaying a password checking interface and quitting the password checking operation, if the triggered key is a number key and a length of the key data is shorter than a preset length; performing a corresponding operation upon an else key value and quitting the password checking operation, if the triggered key is the else key;

Step E2, determining whether the password in the key data buffer is correct, executing Step E3 if the password is correct; executing Step E4 if the password is not correct;

Step E3, prompting that the password is correct, clearing password failure times, delaying a fourth preset time, clearing the key data buffer, determining that the password is correct, ending the password checking operation;

Step E4, adding 1 to the number of the password failure times, displaying a password failure interface, delaying the fourth preset time, executing Step E5;

Step E5, determining whether the number of the password failure times is equal to the number of preset times;

clearing the key data buffer, determining that the password is not correct and the dynamic token sleeping, if the number of the password failure times is equal to the number of the preset times; displaying a password input interface, clearing the key data buffer and the dynamic token sleeping, if the password failure times is not equal to the preset times.

In Step S-3, the clearing the data in the key data buffer and the dynamic token sleeping, if the triggered key is a Delete key, comprises:

Step A1, determining whether a duration of pressing down the Delete key reaches a preset duration;

executing Step A2 if the duration of pressing down the Delete key reaches the preset duration; executing Step A5 if the duration of pressing down the Delete key does not reach the preset duration;

Step A2, determining whether data exist in the key data buffer;

executing Step A4 if data exist in the key data buffer; executing Step A3 if no data exist in the key data buffer;

Step A3, displaying a menu interface, storing the system state identification as a menu function selection identification, the dynamic token sleeping;

Step A4, clearing the key data buffer, displaying an challenge code input interface, the dynamic token sleeping;

Step A5, determining whether data exist in the key data buffer;

executing Step A6 if the data exist in the key data buffer; executing Step A7 if no data exist in the key data buffer;

Step A6, clearing a last stored key value in the key data buffer; then executing Step A7;

Step A7, displaying the challenge code information input interface, displaying the data in the key data buffer, the dynamic token sleeping;

Step S-1 further comprises detecting the system state identification; performing a menu function selection operation and the dynamic token sleeping, if the system state identification is a menu function selection identification; where the menu function selection operation comprises:

Step H1, detecting the key value, executing Step H12 if the key is an OK key;

executing a corresponding operation and quitting the menu function selection operation, if the key is an else key value, where the else key value comprises a key value of a Right key and a key value of a Left key;

Step H2, determining a selected function; executing Step H3 if the selected function is a Bluetooth OTP;

performing a corresponding function selection operation and quitting the menu function selection operation, if the selected function is an else function;

Step H3, powering up the Bluetooth module, displaying a Bluetooth OTP interface, storing the system state identification as a Bluetooth OTP identification and executing Step H4;

Step H4, reading a Bluetooth module parameter;

Step H5, determining whether reading a Bluetooth module parameter is successful;

executing Step H6 if the reading is successful; executing Step H7 if the reading is not successful;

Step H6, switching the Bluetooth module into a monitoring mode and quitting the menu function selection operation;

Step H7, adding 1 to the number of times of reading a Bluetooth module parameter;

Step H8, determining whether the number of times of reading a Bluetooth module parameter reaches a sixth preset value;

executing Step H9 if the number of the times reaches the sixth preset value; executing Step H4 if the number of the times does not reach the sixth preset value;

Step H9, prompting that the Bluetooth module is broken, powering off the Bluetooth module, delaying a third preset time, displaying a challenge code information input interface, storing the system state identification as a challenge code input identification, quitting the menu function selection operation.

The basic factor is a time factor; after the initializing of the dynamic token, the method further comprises enabling timer interrupt, the dynamic token sleeping;

in a case that the timer interrupt is detected, updating the time factor, executing regular operation; where the regular operation comprises:

Step G1, determining whether the system state identification is a Bluetooth OTP identification;

adding 1 to a count value of a Bluetooth mode counter and executing Step G2 if the system state identification is a Bluetooth OTP identification; executing Step G7 if the system state identification is not a Bluetooth OTP identification; where an initial count value of the Bluetooth module counter is 0;

Step G2, determining whether the count value of the Bluetooth module counter is less than a first preset value, executing Step G4 if the count value of the Bluetooth mode counter is less than the first preset value; executing Step G3 if the count value of the Bluetooth mode counter is not less than the first preset value;

Step G3, setting the count value of the Bluetooth mode counter as 0, clearing the data receiving buffer, powering off the Bluetooth module, displaying the challenge code information input interface, storing the system state identification as a challenge code input identification and executing Step G6;

Step G4, detecting whether a work voltage of the Bluetooth module is lower than a preset voltage; executing Step G5 if the work voltage of the Bluetooth module is lower than the preset voltage; executing Step G6 if the work voltage of the Bluetooth module is not lower than the preset voltage;

Step G5, setting the count value of the Bluetooth mode counter as 0, clearing the data receiving buffer, powering off the Bluetooth module, displaying the challenge code input information interface, storing the system state identification as a challenge code input identification, displaying prompt information that work voltage is low and please use Bluetooth function after recharging through LCD screen, and executing Step G6;

Step G6, determining whether the system state identification is a challenge code input identification;

executing Step G7 if the system state identification is a challenge code input identification; the dynamic token sleeping if the system state identification is not a challenge code input identification;

Step G7, adding 1 to a count value of a no-key-press counter;

where an initial value of the no-key-press counter is 0;

Step G8, determining whether the count value of the no-key-press counter is less than a second preset value;

the dynamic token sleeping if the count value of the no-key-press counter is less than the second preset value; executing Step G9 if the count value of the no-key-press counter is not less than the second preset value;

Step G9, setting the count value of the no-key-press counter as 0, storing the system state identification as a power-off identification, clearing the key data buffer, the dynamic token sleeping.

Returning the obtained dynamic password to the upper computer comprises displaying the dynamic password via a LCD screen and/or returning the dynamic password to the upper computer via the Bluetooth module.

The basic factor comprises time factor and/or event factor.

An advantage of the present disclosure may include that: an upper computer sends data, which should have been required to be input into the dynamic token by the user, to the dynamic token through Bluetooth; under the condition of the guarantee of password security, the present disclosure omits the step of user input and avoids the problems that an error is apt to appear and time is wasted when a large amount of information is required to be input by the user.

BRIEF DESCRIPTION OF DRAWINGS

FIG. 2 is a flow chart of a working method of a dynamic token provided by Embodiment 2 of the present disclosure;

DETAILED DESCRIPTION OF THE DISCLOSURE

Technical solutions of the embodiments of the disclosure are described clearly and completely in conjunction with the drawings as follows. Apparently, the described embodiments are merely a few but not all of the embodiments according to the disclosure. Based on the described embodiments of the disclosure, other embodiments obtained by those of ordinary skill in the art without any creative work fall in the scope of the disclosure.

Embodiment 1

Figure 1:
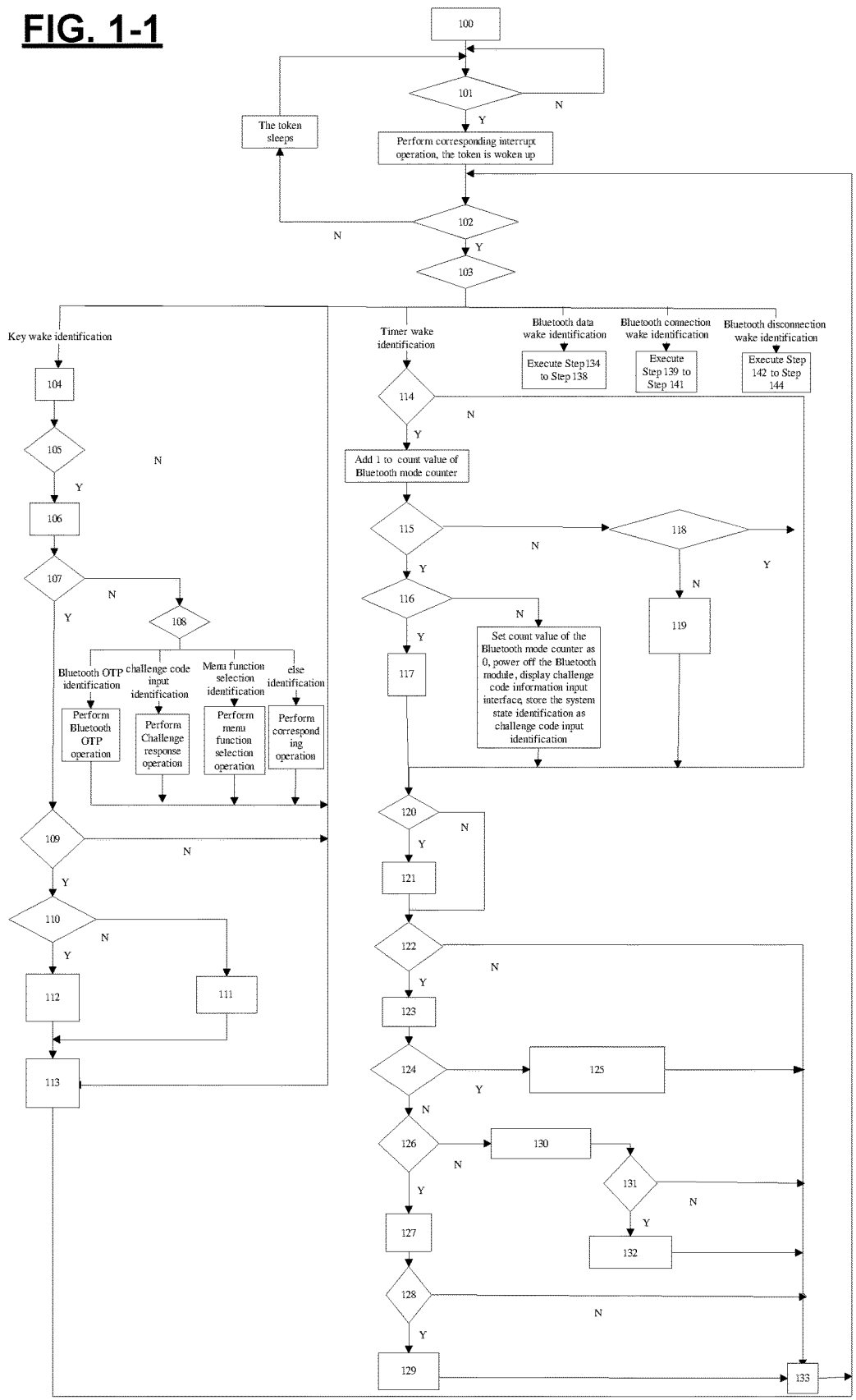
FIG. 1-1 and FIG. 1-2 respectively present a flow chart of a working method of a dynamic token provided by Embodiment 1 of the present disclosure.
Figures 1, 2:
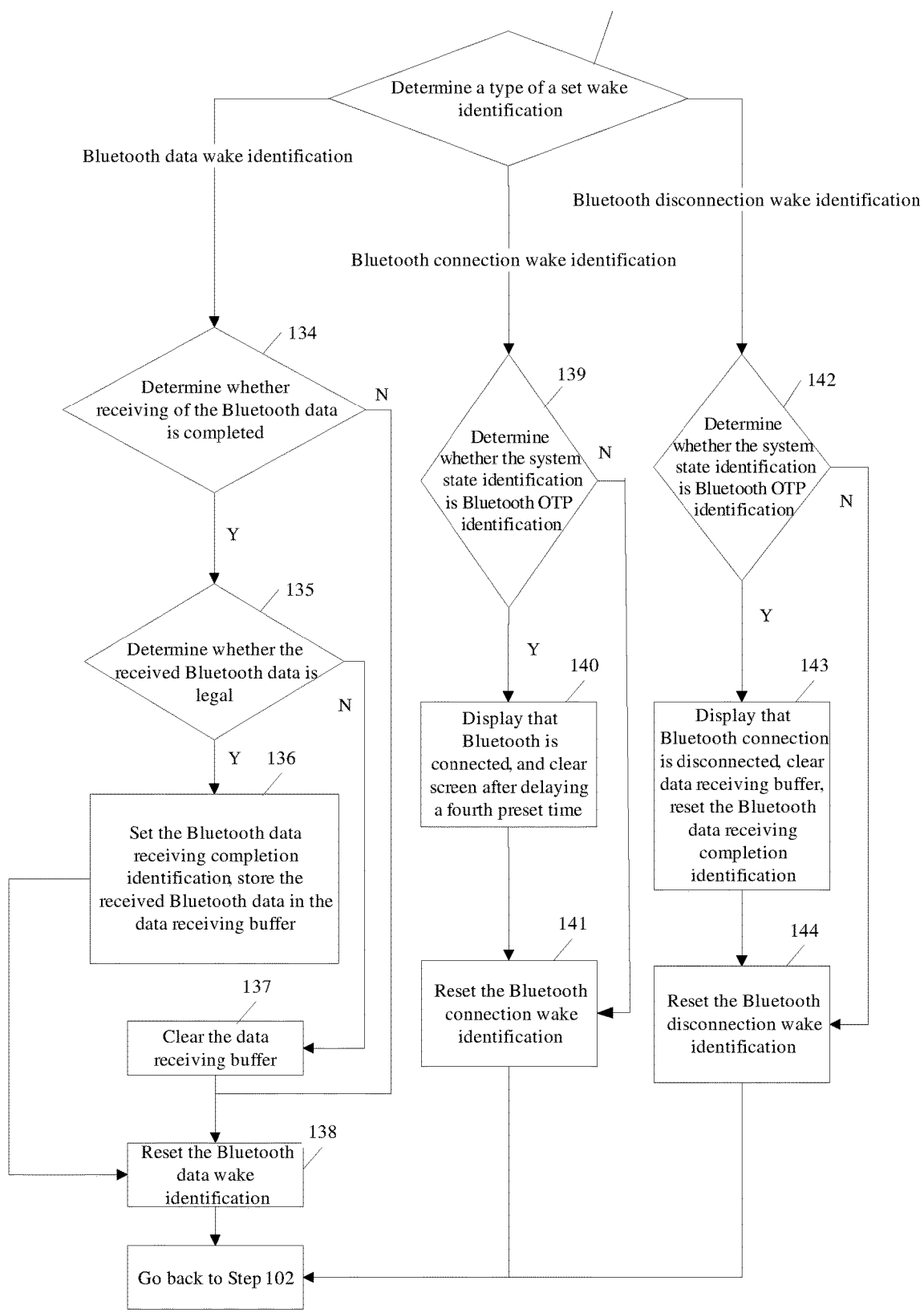
Figure 2:
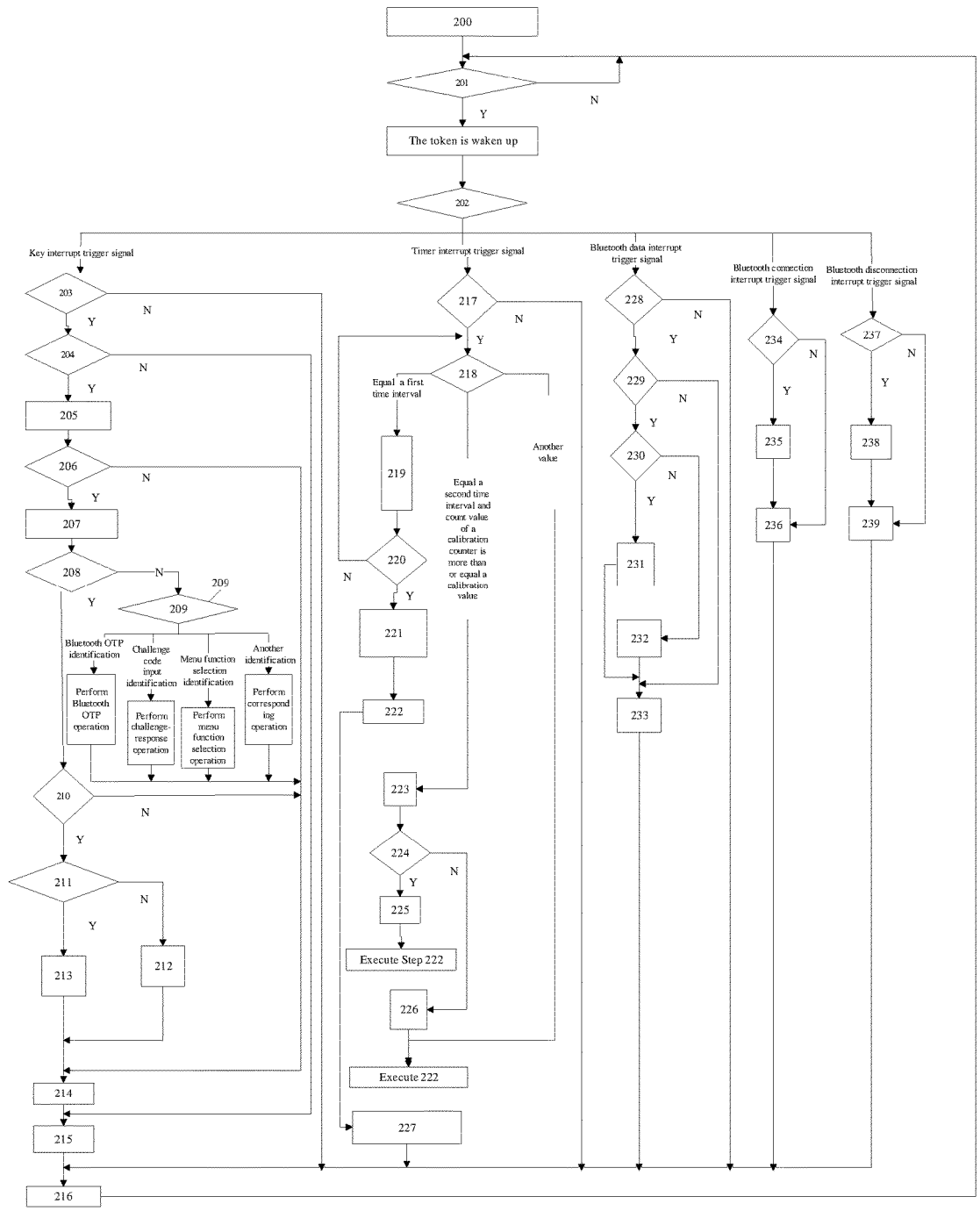

As shown by FIG. 1-1 and FIG. 1-2, Embodiment 1 of the present disclosure provides a working method of a dynamic token, which includes following Steps.

In Step 100, the dynamic token is initialized.

In Embodiment 1, a MCU (Microprogrammed Control Unit) is initialized, a stack pointer is pointed at stack start address, a RAM (Random Access Memory) is initialized, a global variable is cleared, all wake identifications are reset, a system state identification is set as a power-off identification, key interrupt and/or Bluetooth data interrupt and/or Bluetooth connection interrupt and/or Bluetooth disconnection interrupt and/or timer interrupt is (are) enabled, all interrupt identifications are reset, the token sleeps and Step 101 is executed.

In Step 101, interrupt trigger signal is waited for being received and whether an interrupt trigger signal is received is determined;

if the interrupt trigger signal is received, a corresponding interrupt process is executed, the token is woken up and Step 102 is executed; otherwise, Step 101 is executed.

In Embodiment 1, the interrupt trigger signal includes a key interrupt trigger signal, a timer interrupt trigger signal, a Bluetooth data interrupt trigger signal, a Bluetooth connection interrupt trigger signal, and a Bluetooth disconnection interrupt trigger signal.

When the token receives the key interrupt trigger signal, a key interrupt process is entered, which includes Step b1 to Step b4.

In Step b1, whether a key interrupt identification is set is determined; if the key interrupt identification is set, Step b2 is executed; if the key interrupt identification is not set, the key interrupt process is quitted.

In Step b2, whether a key is pressed down is determined; if the key is pressed down, Step b3 is executed; if no key is pressed down, Step b4 is executed; further a delay debounce process can be added in Step b2.

In Step b3, a key wake identification is set.

In Step b4, the key interrupt identification is reset and the key interrupt process is quitted.

When the token receives a timer interrupt trigger signal, a timer interrupt process is entered, which includes Step c1 to Step c6:

In Step c1, whether a timer interrupt identification is set is determined; if the timer interrupt identification is set, Step c2 is executed; if the timer interrupt identification is not set, timer interrupt process is quitted.

In Step c2, 1 is added to a count number of a second counter, the count value of the second counter is detected; if the count value of the second counter equals a first time interval, the count value of the second counter is cleared, 1 is added to a time factor, an event factor is cleared, 1 is added to a count value of an calibration counter, and Step c3 is executed; if the count value of the second counter equals a second time interval and a count value of the calibration counter is greater than or equal to a calibration value, a result of deducting the calibration value from the count value of the calibration counter is stored as a new count value of the calibration counter, Step c4 is executed; otherwise, Step c5 is executed.

In Step c3, whether the system state identification is a wait identification is determined; if the system identification is the wait identification, disable LCD (Liquid Crystal Display) and the system state identification is stored as the power-off identification, Step c5 is executed; otherwise, Step c2 is executed.

In Step c4, whether a calibration direction identification is set is determined, if the calibration direction identification is set, 1 is deducted from a count value the second counter, Step c5 is executed; if the calibration direction identification is not set, 1 is added to the count value of the second counter, Step c5 is executed; where setting or resetting the calibration direction identification is factory set.

In Step c5, a timer wake identification is set, the timer interrupt identification is reset, the timer interrupt process is quitted.

When the token receives the Bluetooth data interrupt trigger signal, a Bluetooth data interrupt process is entered, which includes Step d1 to Step d2.

In Step d1, whether a Bluetooth data interrupt identification is set is determined, if the Bluetooth data interrupt identification is set, Step d2 is executed; if the Bluetooth data interrupt identification is not set, the Bluetooth data interrupt process is quitted.

In Step d2, a Bluetooth data wake identification is set, the Bluetooth data interrupt identification is reset and the Bluetooth data interrupt process is quitted.

When the token receives the Bluetooth connection interrupt trigger signal, a Bluetooth connection interrupt process is entered, which includes that:

a Bluetooth connection wake identification is set, the Bluetooth connection interrupt identification is reset and the Bluetooth connection interrupt process is quitted;

When the token receives the Bluetooth disconnection interrupt trigger signal, a Bluetooth disconnection interrupt process is entered, which includes that the Bluetooth disconnection wake identification is set, the Bluetooth disconnection interrupt identification is reset and the Bluetooth disconnection interrupt process is quitted.

In Step 102, whether a set wake identification exists is determined; if the set wake identification exists, Step 103 is executed; if the set wake identification does not exist, the token sleeps and Step 101 is executed.

In Step 103, a type of the set wake identification is determined;

if the set wake identification is a key wake identification, Step 104-Step 113 are executed;

if the set wake identification is a timer wake identification, Step 114-Step 133 are executed;

if the set wake identification is a Bluetooth data wake identification, Step 134-Step 138 are executed;

if the set wake identification is a Bluetooth connection wake identification, Step 139-Step 141 are executed;

if the set wake identification is Bluetooth disconnection wake identification, Step 142-Step 144 are executed.

In Step 104, the key interrupt is disabled, the key is scanned and a key value is obtained.

In Step 105, whether the key value is non-empty is determined;

if the key value is non-empty, Step 106 is executed; if the key value is empty, Step 113 is executed.

In Step 106, a count value of a no-key-press counter is set as 0.

In Step 107, whether the key pressed down is a power key is determined;

if the key pressed down is a power key, Step 109 is executed; if the key pressed down is not a power key, Step 108 is executed.

In Step 108, the system state identification is detected;

if the system state identification is a Bluetooth OTP identification, Step 113 is executed after a Bluetooth OTP operation; if the system state identification is a challenge code input identification, Step 113 is executed after a challenge-response operation; if the system state identification is a menu function selection identification, Step 113 is executed after a menu function selection operation; if the system state identification is an else identification, Step 113 is performed after a corresponding operation is performed.

In Embodiment 1, the else identification includes a password checking identification.

If the identification is the password checking identification, a password checking operation is executed; where the password checking operation includes Steps E1 to E8.

In Step E1, a key value is checked, if the key value is a key value of an OK key, Step E2 is executed; if the key value is a key value of an else key value, a corresponding operation is executed according to the key value and the password checking operation is quitted.

If the else key value is a key value of a number key and a length of an input number is less than a preset length, the input number is taken as key data to be stored in a key data buffer, a password checking interface is displayed and the password checking operation is quitted.

In Step E2, whether a password is correct is determined, if the password is correct, Step E3 is executed; if the password is not correct, Step E7 is executed.

In Step E3, it is prompted that the password is right, the number of times of password failure is cleared and a fourth preset time is delayed.

In Step E4, whether a work voltage of Bluetooth module is not lower than a preset work voltage is detected, if the work voltage of Bluetooth module is lower than the preset work voltage, Step E5 is executed; if the work voltage of Bluetooth module is not lower than the preset work voltage, Step E6 is executed.

In Step E5, it is prompted that work voltage of Bluetooth module is low and please recharge; after the low work voltage state overpasses a first preset time, the system state identification is stored as a challenge code input identification, the key data buffer is cleared and the password checking operation is quitted.

In Step E6, the Bluetooth module is powered up, a Bluetooth OTP interface is displayed; a count value of a Bluetooth mode counter is cleared to be 0, the system state identification is stored as a Bluetooth OTP identification, the Bluetooth connection interrupt identification is reset, a Bluetooth OTP permitting key input identification is reset, an active selecting Bluetooth identification is reset, the key data buffer is cleared, the Bluetooth module is switched into a monitoring mode and the password checking operation is quitted.

In Step E7, 1 is added to the number of times of password failure and an interface of password failure is displayed, the fourth preset time is delayed.

In Step E8, whether the number of the times of password failure equals a preset number of times is determined;
if the number of the times of password failure equals the preset number of times, the key data buffer is cleared, that the token is locked is displayed, the password checking operation is quitted; if the number of the times of the password failure does not equal the preset number of times, password input interface is displayed, the key data buffer is cleared, the password checking operation is quitted. The locked token can be unlocked automatically after a fifth preset time, or the locked token can be unlocked at a counter of the token issuer.

Figure 3:
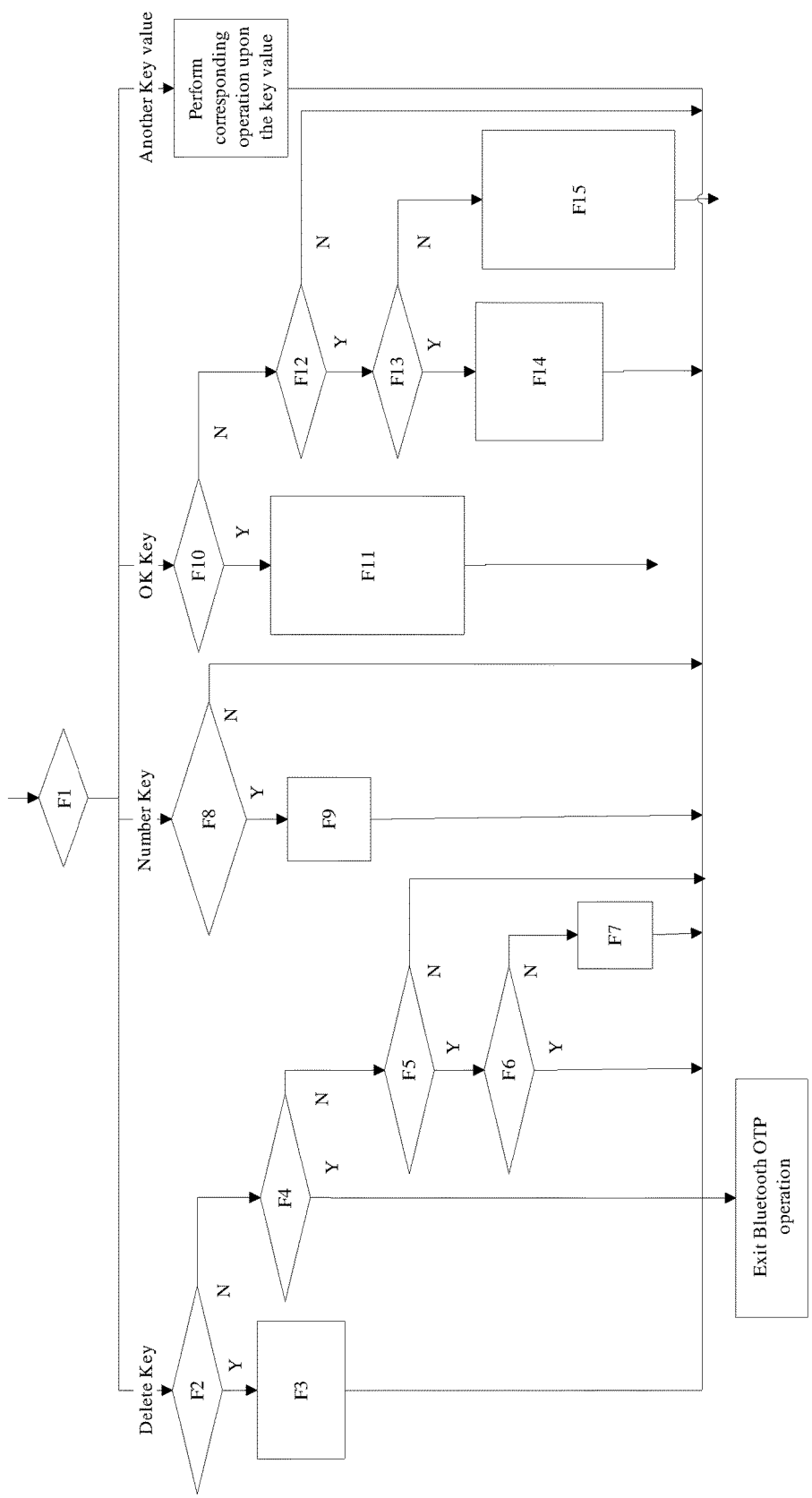
FIG. 3 is a detailed flow chart of an operating method of a Bluetooth OTP (one time password) provided by Embodiment 1 of the present disclosure.

Shown as FIG. 3, performing a Bluetooth OTP operation includes Step F1 to Step F15.

In Step F1, a key value is detected, if the key value is a key value of a Delete key, Step F2 is executed; if the key value is a key value of a number key, Step F8 is executed; if the key value is a key value of an OK key, F10 is executed; if the key value is a key value of an else key value, a corresponding operation is executed according to the key value and the Bluetooth OTP operation is quitted; the else key value includes a key value of a Left key and a key value of a Right Key.

In Step F2, whether a duration of pressing down the Delete key reaches a preset duration is determined;
if the duration reaches the preset duration, Step F3 is executed; if the duration does not reaches the preset duration, Step F4 is executed.

In Step F3, a challenge code information input interface is displayed, the system state identification is stored as challenge code input identification and the Bluetooth OTP operation is quitted.

In Step F4, whether a Bluetooth data receiving completion identification is set is determined;
if the Bluetooth data receiving completion identification is set, the Bluetooth OTP operation is quitted; if the Bluetooth data receiving completion identification is not set, Step F5 is executed.

In Step F5, whether a Bluetooth OTP permitting key input identification is set is determined,
if the Bluetooth OTP permitting key input identification is set, Step F6 is executed; if the Bluetooth OTP permitting key input identification is not set, Bluetooth OTP operation is quitted.

In Step F6, whether a length of the key data equals 0 is determined;
if the length of the key data equals 0, the Bluetooth OTP operation is quitted; if the length of the key data does not equal 0, Step F7 is executed.

In Step F7, 1 is deducted from the length of the key data, last stored key data is cleared from the key data buffer, the data in the key data buffer is displayed and the Bluetooth OTP operation is quitted.

In Step F8, whether a situation, that the Bluetooth OTP permitting key input identification is set and the length of key data is less than a preset length, is satisfied is determined;
if the situation is satisfied, Step F9 is executed; if the situation is not satisfied, the Bluetooth OTP operation is quitted.

In Step F9, 1 is added to the length of the key data, the input number corresponding to the key value is taken as key data to be stored into the key data buffer, data of the key data buffer is displayed, then the Bluetooth OTP operation is quitted.

In Step F10, whether Bluetooth data receiving completion identification is set is determined;
if the Bluetooth data receiving completion identification is set, Step F11 is executed; if the Bluetooth data receiving completion identification is not set, Step F12 is executed.

In Step F11, the data in the data receiving buffer are taken as a challenge value, a challenge-response dynamic password is computed according to the challenge value, the challenge-response dynamic password is displayed, the system state identification is stored as a wait identification, the data receiving buffer is cleared, the Bluetooth OTP operation is quitted; where the taking the data in the data receiving buffer as the challenge data further includes taking a combination of a timer factor and/or an event factor and the data in the data receiving buffer as the challenge value; when the challenge data includes the event factor, the present step further includes adding 1 to the event factor after computing the challenge-response dynamic password; the data in the data receiving buffer can be a random number or transaction information like account number and amount of money, etc.; in the present Step, the challenge-response dynamic password can also be sent to an upper computer through a Bluetooth channel.

In Step F12, whether the Bluetooth OTP permitting key input identification is set is determined;
if the Bluetooth OTP permitting key input identification is set, Step F13 is executed; if the Bluetooth OTP permitting key input identification is not set, the Bluetooth OTP operation is quitted.

In Step F13, whether a length of the key data equals 0 is determined;
 if the length of the key data equals 0, Step F14 is executed; if the length of the key data does not equal 0, Step F15 is executed.

In Step F14, a time-type dynamic password is computed according to the time factor inside the token, the time-type dynamic password is displayed, the system state identification is stored as a wait identification, then the Bluetooth OTP operation is quitted.

Also, Step F14 can include that an event type dynamic password is computed according to the event factor, 1 is added to the event factor, the event type dynamic password is displayed and the system state identification is stored as a wait identification.

In Step F14, the time-type dynamic password (or the event type dynamic password) can be sent to the upper computer through a Bluetooth channel.

In Step F15, the data in the key data buffer is taken as the challenge value, a challenge-response type dynamic password is computed according to the challenge value, the challenge-response type dynamic password is displayed, the system state identification is stored as a wait identification, the key data buffer is cleared, then the Bluetooth OTP operation is quitted. In this case, the taking the data in the key data buffer as challenge data further includes taking a combination of the time factor and/or the event factor and the data in the key data buffer as the challenge data; when the challenge value includes the event factor, the present step further includes adding 1 to the event factor after computing the challenge-response dynamic password.

In Step F15, the challenge-response dynamic password can be sent to the upper computer through a Bluetooth channel.

Figure 4:
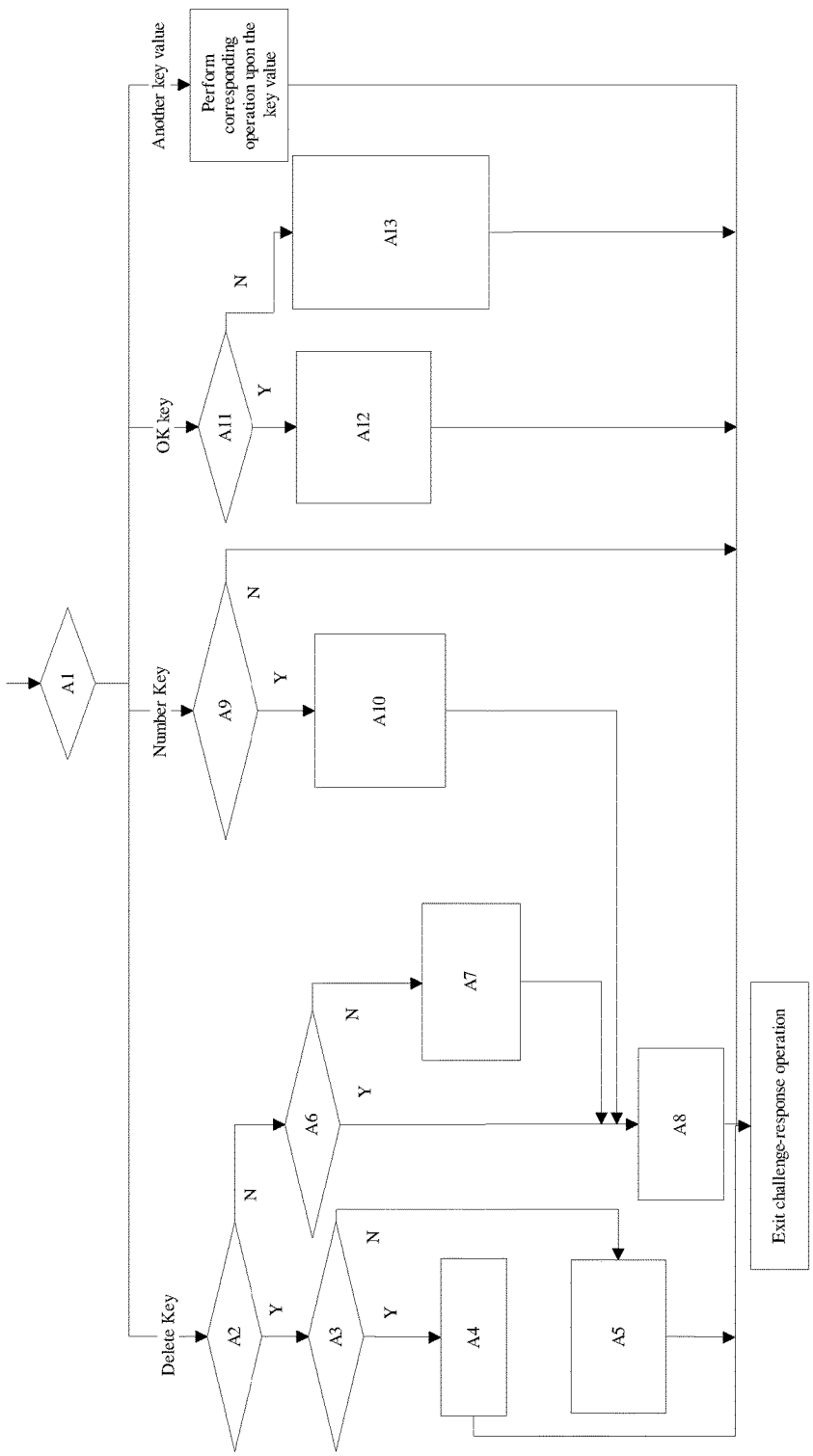
FIG. 4 is a detailed flow chart of a challenge-response operating method provided by Embodiment 1 of the present disclosure.

FIG. 4 shows a Challenge-response operation, which includes Step A1 to Step A13.

In Step A1, a key value is detected; if the key is a Delete key, Step A2 is executed; if the key is a number key, Step A9 is executed; if the key is an OK key, Step A11 is executed; if the key is an else key value, a corresponding operation is performed according to the key value and the challenge-response operation is quitted.

In Step A2, whether a duration of pressing down the Delete key reaches a preset duration is determined;
 if the duration of pressing down the Delete key reaches the preset duration, Step A3 is executed; if the duration of pressing down Delete key does not reach the preset duration, Step A6 is executed.

In Step A3, whether a length of the key data equals 0 is determined;
 if the length of the key data equals 0, Step A4 is executed;
 if the length of the key does not equal 0, Step A5 is executed.

In Step A4, a menu interface is displayed, the system state identification is stored as a menu function selection identification, and then the challenge-response operation is quitted.

In Step A5, the key data buffer is cleared, the challenge code information input interface is displayed, the length of the key data is set as 0, the challenge-response operation is quitted.

Step A6, whether a length of the key data equals 0 is determined;
 if the key data length equals 0, Step A8 is executed; if the key data length does not equal 0, Step A7 is executed.

In Step A7, 1 is deducted from the length of the key data, last stored key data in the key data buffer is cleared; then Step A8 is executed.

In Step A8, the challenge code information input interface is displayed, the data in the key data buffer is displayed, then the challenge-response operation is quitted.

In Step A9, whether the length of the key data is less than a preset length is determined; if the length of the key data is less than the preset length, Step A10 is executed; if the length of the key data is not less than the preset length, the challenge-response operation is quitted.

In Step A10, the input number corresponding to the key value is stored as key data in the key data buffer, 1 is added to the length of the key data and the challenge-response operation is quitted.

In Step A11, whether the length of the key data equals 0 is determined;
 if the length of the key data equals 0, Step A12 is determined; if the key data length does not equal 0, Step A13 is executed.

In Step A12, a time-type dynamic password is computed according to a time factor inside the token, the time-type dynamic password is displayed and the system state identification is stored as a wait identification.

Also, the present Step can include that a event type dynamic password is computed according to an event factor inside the token, 1 is added to the event factor, the event type dynamic password is displayed, the system state identification is stored as a wait identification.

In the present step, the time-type dynamic password (or event type dynamic password) can be sent to the upper computer through a Bluetooth channel.

In Step A13, the data in the key data buffer is taken as a challenge value, a challenge-response dynamic password is computed according to the challenge value, the challenge-response dynamic password is displayed, the system state identification is stored as a wait identification, the key data buffer is cleared, and then the challenge-response operation is quitted The taking the data in the key data buffer as a challenge value further includes taking a combination of a time factor and/or an event factor and the data in the key data buffer as the challenge value; when the challenge value includes the event factor, the present step further includes adding 1 to the event factor after computing the challenge-response dynamic password.

Figure 5:
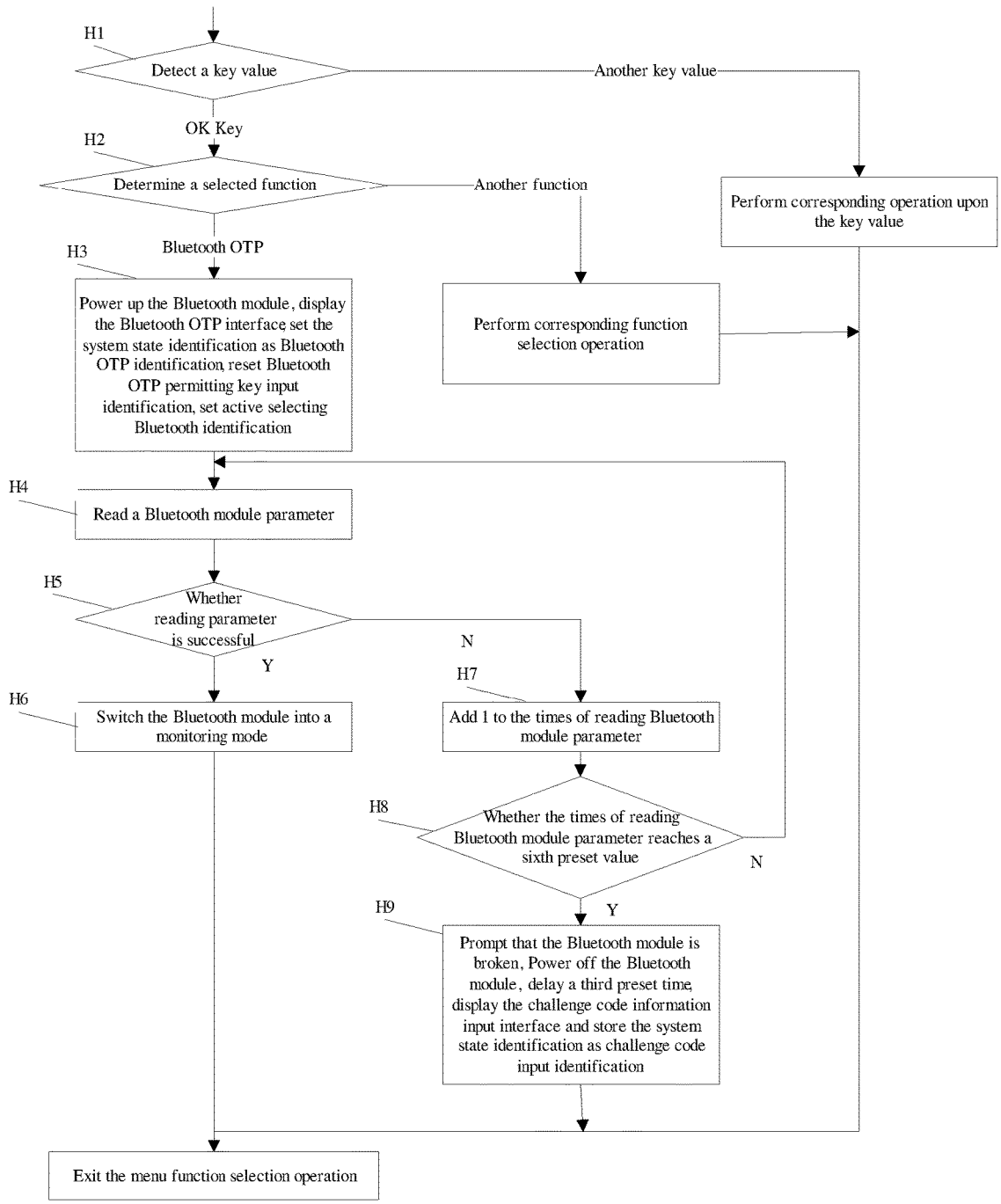
FIG. 5 is a detailed flow chart for an operating method for a menu function selection provided by Embodiment 1 of the present disclosure.

The menu function selection operation is shown as FIG. 5, which includes Step H1 to Step H9.

In Step H1, a key value is detected, if the key is an OK key, Step H2 is executed;
 if the key value is an else key, a corresponding operation is executed according to the key value, the menu function selection operation is quitted; where the else key includes a Right key and a Left key.

In Step H2, the selected function is determined, if the selected function is a Bluetooth OTP, Step H3 is executed;
 if the selected function is an else function, a corresponding function selection is executed, then the menu function selection operation is quitted.

In Step H3, the Bluetooth module is powered up, the Bluetooth OTP interface is displayed, the system state identification is stored as a Bluetooth OTP identification, the Bluetooth OTP permitting key input identification is reset, the active selecting Bluetooth identification is set and Step H4 is executed;

In Step H4, a Bluetooth module parameter is read;
 where the Bluetooth module parameter includes information like a device name, a password, etc.

In Step H5, whether reading a Bluetooth module parameter is successful is determined; if the reading is successful, Step H6 is executed; if the reading is not successfully, Step H7 is executed;

In Step H6, the Bluetooth module is switched into a monitoring mode, the menu function selection operation is quitted;

In Step H7, 1 is added to the number of the times of reading the Bluetooth module parameter;

In Step H8, whether the number of the times of reading the Bluetooth module parameter reaches a sixth preset value;
- if the number of the times of reading the Bluetooth module parameter reaches the sixth preset value, Step H9 is executed; if the number of the times of reading the Bluetooth module parameter does not reach the sixth preset value, Step H4 is executed;

In Step H9, it is prompted that the Bluetooth module is broken, the Bluetooth module is powered off, a third preset time is delayed, a challenge code information input interface is displayed, the system state identification is stored as a challenge code input identification, the menu function selection operation is quitted.

In Step 109, whether a duration of pressing down a power key reaches a preset duration is determined; if the duration of pressing down the power key reaches the preset duration, Step 110 is executed; if the duration of pressing down the power key does not reach the preset duration, Step 113 is executed.

In Step 110, whether the system state identification is a power-off identification is determined;
- if the system state identification is the power-off identification, Step 112 is executed; if the system state identification is not the power-off identification, Step 111 is executed.

In Step 111, the system state identification is stored as a power-off identification, the key data buffer is cleared, the LCD is disabled, the Bluetooth module is powered off and Step 113 is executed.

In Step 112, the LCD is enabled; the LCD is powered up and initialized.

The present step includes performing a power-on operation and setting the system state identification as a password checking identification.

The present step further includes determining whether the token is locked, if the token is locked, prompting the user to unlock the token at a counter of the token issuer or to wait for automatic unlocking of the token; if the token is not locked, executing is kept on.

In Step 113, the key wake identification is reset, the key interrupt is enabled, then Step 102 is executed.

In Step 114, whether the system state identification is a Bluetooth OTP identification is determined;
- if the system state identification is the Bluetooth OTP identification, 1 is added to the count value of the Bluetooth mode counter and Step 115 is executed; if the system state identification is not the Bluetooth OTP identification, Step 120 is executed.

In Step 115, whether the count value of the counter in the Bluetooth module is greater than or equal to the first preset value is determined;
- if the count value is greater than or equal to the first preset value, Step 116 is executed; if the count value is neither greater than nor equal to the first preset value, Step 118 is executed;

In Step 116, whether an active selecting Bluetooth identification is reset is determined, if the active selecting Bluetooth identification is reset, Step 117 is executed; if the active selecting Bluetooth identification is not reset, the count value of the Bluetooth mode counter is set as 0, the Bluetooth module is powered off, the challenge code information input interface is displayed, the system state identification is stored as the challenge code input identification, then Step 120 is executed.

In Step 117, the count value of the Bluetooth mode counter is set as 0, the Bluetooth module is powered off, the Bluetooth OTP permitting key input identification is set, then Step 120 is executed;

In Step 118, whether a work voltage of the Bluetooth module is not lower than a preset voltage is determined, if the work voltage is not lower than the preset voltage, Step 120 is executed; if the work voltage is lower than the preset voltage, Step 119 is executed.

In Step 119, the count value of the Bluetooth mode counter is set as 0, the Bluetooth module is powered off, the challenge code information input interface is displayed, the system state identification is stored as a challenge code input identification, that work voltage of the Bluetooth module is low and please use Bluetooth function after recharging is prompted, Step 120 is executed.

In Step 120, whether the system state identification is a wait identification is determined;
- if the system state identification is a wait identification, Step 121 is executed; if the system state identification is not a wait identification, Step 122 is executed.

In Step 121, a time bar is displayed.

In Step 122, whether the system state identification is a challenge code input identification is determined; if the system state identification is a challenge code input identification, Step 123 is executed; if the system state identification is not a challenge code input identification, Step 133 is executed.

In Step 123, 1 is added to the count value of the no-key-press counter.

In Step 124, whether the count value of the no-key-press counter is greater than or equal to a second preset value;
- if the count value is greater than or equal to the second preset value, Step 125 is executed; otherwise, Step 126 is executed.

In Step 125, the count value of the no-key-press counter is set as 0, the system state identification is stored as a power-off identification, then Step 133 is executed.

In Step 126, whether a key is pressed down is determined; if a key is pressed down, Step 127 is executed; otherwise, Step 130 is executed.

In Step 127, 1 is added to a count value of a key-press counter, a count value of a key-release counter is set as 0.

In Step 128, whether the count value of the key-press counter is greater than a third preset value;
- if the count value of the counter is greater than the third preset value, Step 129 is executed; otherwise, Step 133 is executed;
- where the third preset value may be 10.

In Step 129, the count value of the key-press counter is set as 0, the key interrupt is disabled, Step 133 is executed;

In Step 130, 1 is added to the count value of the key-release counter, the count value of the key-press counter is set as 0, then Step 131 is executed.

In Step 131, whether the count value of the key-release counter is greater than a fourth preset value is determined; if the count value of the key-release counter is greater than the fourth preset value, Step 132 is executed; otherwise, Step 133 is executed; where the fourth preset value may be 4.

In Step 132, the count value of the key-release counter is set as 0, the key interrupt is enabled, Step 133 is executed;

In Step 133, the timer wake identification is reset, then the process goes back to Step 102.

In Step 134, Bluetooth data are received, whether the receiving of Bluetooth data is completed is determined; if the receiving of Bluetooth data is completed, Step 135 is executed; if the receiving of Bluetooth data is not completed, Step 138 is executed.

In Embodiment 1, the Bluetooth data are received in form of bytes, the received bytes include length information of the Bluetooth data, the data are received according to the length information, when the length of the received bytes equals the length information, the receiving of the Bluetooth data is completed.

In Step 135, whether the received Bluetooth data is legal is determined;
   if the received Bluetooth data is legal, Step 136 is executed; otherwise,
   Step 137 is executed.

In Embodiment 1, a check byte in the received data is obtained, an exclusive OR operation is performed on the part except for the check byte in the data, a result of the exclusive OR operation is compared with the check byte, if a result of the comparison is match, the received data are legal; otherwise, the received data are not legal.

In Step 136, the Bluetooth data receiving completion identification is set, the received Bluetooth data is stored in the data receiving buffer, Step 138 is executed.

In Step 137, the data buffer is cleared and then Step 138 is executed.

In Step 138, the Bluetooth data wake identification is reset and then Step 102 is executed.

In Step 139, whether the system state identification is a Bluetooth OTP identification is determined; if the system state identification is a Bluetooth OTP identification, Step 140 is executed; otherwise, Step 141 is executed.

In Step 140, that Bluetooth is connected is displayed; screen is cleared after a fourth preset time is delayed.

In Step 141, the Bluetooth connection wake identification is reset, then the process returns to Step 102.

In Step 142, whether the system state identification is a Bluetooth OTP identification is determined;
   if the system state identification is a Bluetooth OTP identification, Step 143 is executed; otherwise, Step 144 is executed.

In Step 143, that Bluetooth is disconnected is displayed, the data receiving buffer is cleared, the Bluetooth data receiving completion identification is reset and then Step 144 is executed.

In Step 144, the Bluetooth disconnection wake identification is reset and then Step 102 is executed.

Embodiment 2

As shown by FIG. 2, a working method of a dynamic token is provided by Embodiment 2 of the present disclosure, which includes following steps.

In Step 200, the token is initialized.

In Embodiment 2, an MCU (Microprogrammed Control Unit) is initialized, a stack pointer is pointed at a stack start address, RAM (Random Access Memory) is initialized, a global variable is cleared, all interrupt identifications are reset, a system state identification is set as a power-off identification, key interrupt and/or timer interrupt and/or Bluetooth data interrupt and/or Bluetooth connection interrupt and/or Bluetooth disconnection interrupt is enabled, the token sleeps and Step 201 is executed.

In Step 201, an interrupt trigger signal is waited for being received and whether the interrupt trigger signal is received is determined;
   if the interrupt trigger signal is received, the token is wake up and Step 202 is executed; otherwise, Step 201 is executed.

In Embodiment 2, the interrupt trigger signal includes a key interrupt trigger signal, a timer interrupt trigger signal, a Bluetooth data interrupt trigger signal, a Bluetooth connection interrupt trigger signal, and a Bluetooth disconnection interrupt trigger signal.

In Step 202, a type of the interrupt trigger signal is determined;
   if the interrupt trigger signal is a key interrupt trigger signal, Step 203 is executed;
   if the interrupt trigger signal is a timer interrupt trigger signal, Step 217 is executed;
   if the interrupt trigger signal is a Bluetooth data interrupt trigger signal, Step 228 is executed;
   if the interrupt trigger signal is a Bluetooth connection interrupt trigger signal, Step 234 is executed;
   if the interrupt trigger signal is a Bluetooth disconnection interrupt trigger signal, Step 237 is executed.

In Step 203, whether an key interrupt identification is set is determined;
   if the key interrupt identification is set, Step 204 is executed; otherwise, Step 216 is executed.

In Step 204, whether a key is pressed down is determined;
   if the key is pressed down, Step 205 is executed; otherwise, Step 215 is executed;
   where delay debounce processing can also be added in Step 204.

In Step 205, the key interrupt is disabled, the key is scanned and a key value is obtained, Step 206 is executed.

In Step 206, whether the key value is non-empty is determined;
   if the key value is non-empty, Step 207 is executed, if the key value is empty, Step 214 is executed.

In Step 207, a count value of a no-key-press counter is set as 0 and Step 208 is executed.

In Step 208, whether the key pressed down is a power key is determined;
   if the key pressed down is a power key, Step 210 is executed; otherwise, Step 209 is executed.

In Step 209, a system state identification is detected.
   if the system state identification is a Bluetooth OTP identification, Step 214 is executed after executing a Bluetooth OTP operation; if the system state identification is a challenge code input identification, Step 214 is executed after executing challenge-response operation; if the system state identification is a menu function selection identification, Step 214 is executed after executing menu function selection operation; if the system state identification is an else identification, Step 214 is executed after executing a corresponding operation. The else identification includes a password checking identification; if the else identification is a password checking identification, a password checking operation is executed; the detailed operation is the same as that in the method described in Embodiment 1.

The method for the Bluetooth OTP operation in Embodiment 2 is the same as that described in Embodiment 1; the method for executing the challenge response operation in Embodiment 2 is the same as that described in Embodiment 1; the method for executing the menu function selection method in Embodiment 2 is the same as that in Embodiment 1; and no more detail is repeated here.

In Step 210, whether a duration of pressing a power key reaches a preset duration is determined;
if the duration of pressing the power key reaches the preset duration, Step 211 is executed; if no, Step 214 is executed.

In Step 211, whether the system state identification is a power-off identification is determined;
if the system state identification is a power-off identification, Step 213 is executed; otherwise, Step 212 is executed.

In Step 212, the system state identification is stored as a power-off identification, the key data buffer is cleared, LCD is disabled, the Bluetooth module is powered off and Step 214 is executed;

In Step 213, an LCD is enabled, the LCD is powered up and initialized, Step 214 is executed;

In Step 213, an power-up operation is executed, the system state identification is set as a password checking identification; Step 213 further includes determining whether the token is locked, displaying that the token is locked and prompting the user to unlock the token at a counter of the issuer or waiting for automatic unlocking, if the token is locked.

In Step 214, the key interrupt is enabled.

In Step 215, the key interrupt identification is reset.

In Step 216, the token sleeps and Step 201 is executed.

In Step 217, whether the timer interrupt identification is set is determined;
if the timer interrupt identification is set, Step 218 is executed; if the timer interrupt identification is not set, Step 216 is executed.

In Step 218, 1 is added to a count value of a second counter, the count value of the second counter is detected; if the count value equals a first time interval, Step 219 is executed; if the count value of the second counter equals a second time interval and a count value of a calibration counter is greater or equal to a calibration value, Step 223 is executed; if the count value is an else value, Step 222 is executed.

In Step 219, the count value of the second counter is cleared, 1 is added to a time factor, an event factor is cleared, 1 is added to the count value of the calibration counter and Step 220 is executed;

In Step 220, whether the system state identification is a wait identification is determined;
if the system state identification is a wait identification, Step 221 is executed; if the system state identification is not a wait identification, Step 218 is executed.

In Step 221, the LCD is disabled, the system state identification is stored as a power-off identification and Step 222 is executed;

In Step 222, a regular operation is executed and then Step 227 is executed;

In Embodiment 2, the executing a regular operation includes Step K1 to Step K9.

In Step K1, whether the system state identification is a Bluetooth OTP identification is determined, if the system state identification is a Bluetooth OTP identification, 1 is added to the Bluetooth mode counter, Step K2 is executed; otherwise, Step K3 is executed;

In Step K2, whether the count value of the Bluetooth mode counter is greater or equal to a first preset value is determined, if the count value of the Bluetooth mode counter is greater than or equal to the first preset value, whether an active selecting Bluetooth identification is set is detected, if the active selecting Bluetooth identification is set, the count value of the Bluetooth mode counter is set as 0, the Bluetooth mode is powered off, a Bluetooth OTP permitting key input identification is set, and K3 is executed; if the Bluetooth OTP permitting key input identification is not set, the count value of the Bluetooth mode counter is set as 0, the Bluetooth module is powered off, a challenge code information input interface is displayed, the system state identification is stores as a challenge code input identification, then Step K3 is executed; if the count value of the Bluetooth mode counter is neither greater than nor equal to the first preset value, whether a work voltage of the Bluetooth module is lower than a preset voltage is detected, if the work voltage is not lower than the preset voltage, Step K3 is executed; if the work voltage is lower than the preset voltage, the count value of the Bluetooth mode counter is set as 0, the Bluetooth module is powered off, the challenge code information input interface is displayed, the system state identification is stored as the challenge code input identification, a prompt information that the work voltage is low and please use the Bluetooth function after recharging is output by a LCD screen, then Step K3 is executed.

In Step k3, whether the system state identification is a wait identification is determined, if the system state identification is a wait identification, a time bar is displayed and Step K4 is executed; otherwise, Step K4 is executed.

In Step K4, whether the system state identification is a challenge code input identification is determined.
if the system state identification is a challenge code input identification, 1 is added to a count value of the no-key-press counter, then Step K5 is executed; otherwise, Step K9 is executed.

In Step K5, whether the count value of the no-key-press counter is greater or equal to a second preset value is determined;
if the count value of the no-key-press counter is greater or equal to the second preset value, the count value of the no-key-press counter is set as 0, the system state identification is stored as a power-off identification and Step K9 is executed; otherwise, Step K6 is executed.

In Step K6, whether a key is pressed down is determined;
if a key is pressed down, 1 is added to a count value of a key-press-down counter, a counter value of a key-release counter is set as 0 and then Step K8 is executed; otherwise, 1 is added to the count value of the key-release counter, the count value of the key-press-down counter is set as 0, and then Step K7 is executed.

In Step K7, whether the count value of the key-release counter is greater than a fourth preset value is determined;
if the count value of the key-release counter is greater than the fourth preset value, the count value of the key-release counter is set as 0, the key interrupt is enabled and Step K9 is executed; otherwise, Step K9 is executed;
where the fourth preset value can be 4.

In Step K8, whether the count value of the key-press-down counter is greater than a third preset value is determined;
if the count value of the key-press-down counter is greater than the third preset value, count value of the key-press-down counter is set as 0, the key interrupt is disabled and Step K9 is executed; otherwise, Step K9 is executed;
where the third preset value can be 10.

In Step K9, the timer interrupt identification is reset, the token sleeps and then Step 201 is executed.

In Step 223, a new count value of the calibration counter is computed;

where in Embodiment 2, a result of the count value of the calibration counter minus the calibration value is taken as a new count value of the calibration counter.

In Step 224, whether a calibration direction identification is set is determined;
where in Embodiment 2, the set or reset of the calibration direction identification is factory set;
if the calibration direction identification is set, Step 225 is executed; if the calibration direction identification is not set, Step 226 is executed;

In Step 225, 1 is deducted from the count value of the second counter, Step 222 is executed.

In Step 226, 1 is added to the count value of the second counter, Step 222 is executed.

In Step 227, the timer interrupt identification is reset, the process goes back to Step 216.

In Step 228, whether a Bluetooth data interrupt identification is set is determined;
if the Bluetooth data interrupt identification is set, Step 229 is executed; otherwise, Step 216 is executed.

In Step 229, Bluetooth data are received, whether receiving of the Bluetooth data is completed is determined;
if the receiving of Bluetooth data is completed, Step 230 is executed; otherwise, Step 233 is executed.

In Embodiment 2, the Bluetooth data are received in form of bytes; the received bytes include length information of the Bluetooth data; the data are received according to the length information; when the length of received bytes is equal to the length information, the receiving of Bluetooth data is completed.

In Step 230, whether the received data are legal is determined;
if the received data are legal, Step 231 is executed; otherwise, Step 232 is executed.

In Step 231, a Bluetooth data receiving completion identification is set, the received data is stored in the data receiving buffer and Step 233 is executed.

In Step 232, the data receiving buffer is cleared and Step 233 is executed.

In Step 233, the Bluetooth data interrupt identification is reset, the process goes back to Step 216.

In Step 234, whether the system state identification is a Bluetooth OTP identification is determined;
if the system state identification is a Bluetooth OTP identification, Step 235 is executed; otherwise, the process goes back to Step 236.

In Step 235, that Bluetooth is connected is displayed; the screen is cleared after delaying a fourth preset time.

In Step 236, the Bluetooth connection interrupt identification is reset, the process goes back to Step 216.

In Step 237, whether the state status identification is a Bluetooth OTP identification is determined;
if the system state identification is the Bluetooth OTP identification, Step 238 is executed; otherwise, Step 239 is executed;

In Step 238, that the Bluetooth is disconnected is displayed, the data receiving buffer is cleared and the Bluetooth data receiving completion identification is reset;

In Step 239, the Bluetooth disconnection interrupt identification is reset and the process goes back to Step 216.

The described embodiments are merely particular embodiments of the disclosure and the embodiments are not intended to limit the disclosure. Any alteration or change obvious to those skilled in the art based on the disclosure should fall in the scope of protection of the disclosure. Therefore, the disclosure intends to protect what is claimed in claims.

The invention claimed is:

1. A method comprising:
   determining, by a dynamic token that is implemented by a microprogrammed control unit configured to execute instructions stored in a memory, a type of set wake identification, wherein the type of set wake identification is one of a key wake identification, a Bluetooth connection wake identification, a Bluetooth data wake identification, and a Bluetooth disconnection wake identification;
   in response to the dynamic token determining that the set wake identification is the key wake identification:
      obtaining, by the dynamic token, a key value of a triggered key, wherein the key value of the triggered key is one of a power key, a number key, an OK key, and a Delete key;
      determining, by the dynamic token and in response to the key value of the triggered key being the power key, a system state identification, wherein the system state identification is one of a power-off identification, a challenge code input identification, a Bluetooth OTP identification, and an else condition;
      determining, in response to the system state identification being a power-off identification, whether a work voltage of a Bluetooth module is lower than a preset voltage;
      providing, in response to the work voltage of the Bluetooth module being lower than the preset voltage, a prompt that the work voltage of the Bluetooth module is low and setting the system state identification as the challenge code input identification;
      setting, in response to the work voltage of the Bluetooth module not being lower than the preset voltage, the system state identification to the Bluetooth OTP identification and powering up the Bluetooth module;
      setting, in response to the system state identification not being a power-off identification, the system state identification as a power off identification, clearing data in a key data buffer and powering off the Bluetooth module;
      storing, in response to the triggered key being a number key, the number corresponding to the key value in a key data buffer;
      determining, in response to the triggered key being the OK key, whether the Bluetooth data receiving completion identification is set;
         in response to the Bluetooth data receiving the completion identification being set:
            generating a dynamic factor based on at least one of the data in the data receiving buffer and a basic factor of the dynamic token;
            computing a dynamic password based on the dynamic factor; and
            returning the dynamic password to an upper computer;
         in response to the Bluetooth data receiving the completion identification not being set and data existing in the key data buffer:
            generating the dynamic factor based on the basic factor;
            computing the dynamic password based on the dynamic factor; and
            returning the computed dynamic password to an upper computer;

storing, in response to the triggered key being the Delete key, the system state identification as the challenge code input identification; and resetting, by the dynamic token, the key wake identification.

2. The method of claim 1, wherein:

returning the computed dynamic password to the upper computer comprises at least one of displaying the dynamic password via a LCD screen and returning the dynamic password to the upper computer via the Bluetooth module.

3. The method of claim 1, wherein the basic factor comprises a time factor and an event factor.

4. The method of claim 1 further comprising:

in response to the work voltage of the Bluetooth module being greater than or equal to the preset voltage:
providing power to the Bluetooth module;
setting the system state identification as the Bluetooth OTP identification; and
setting the Bluetooth module to a monitoring mode; and in response to the system state not being the power-off identification:
setting the system state identification as the power-off identification; and
clearing data in the key data buffer.

5. The method of claim 1 further comprising:

determining, in response to the triggered key being the OK key, whether data exists in the key data buffer;
clearing, in response to the triggered key being the Delete key, data in the key data buffer;
in response to data existing in the key data buffer:
generating a dynamic factor based on at least one of the data in the key data buffer and the basic factor of the dynamic token;
computing a dynamic password based on the dynamic factor; and
displaying the dynamic password; and
in response to data not existing in the key data buffer:
generating a dynamic factor based on the basic factor of the dynamic token;
computing a dynamic password based on the dynamic factor; and
displaying the dynamic password.

6. The method of claim 1 further comprising:

performing a password checking operation, wherein the password checking operation includes:
determining, by the dynamic token, the key value of the triggered key;
in response to the triggered key being a number key and a length of the key data is less than a preset length:
storing key data corresponding to the number key in the key data buffer;
displaying a password checking interface; and
quitting the password checking operation;
in response to one of the triggered key not being a number key and the length of the key data being greater than or equal to the preset length:
performing a corresponding operation based on the key value of the triggered key; and
quitting the password checking operation;
determining, in response to the key value of the triggered key being an OK key, whether the password in the key data buffer is correct;
in response to the password in the key data buffer being correct:

providing a prompt that the password is correct, clearing password failure times;
delaying a fourth preset time;
clearing the key data buffer; and
determining that the password is correct;
in response to the password in the key data buffer being incorrect:
adding 1 to the number of the password failure times;
displaying a password failure interface;
delaying the fourth preset time;
determining, whether the number of the password failure times is equal to a number of preset times;
in response to the number of the password failure times being equal to the number of present time:
clearing the key data buffer;
in response to the number of the password failure times not being equal to the number of preset times:
displaying the password interface; and
determining, in response to the password checking operation determining that the password is correct, whether a work voltage of the Bluetooth module is lower than a preset voltage.

7. The method of claim 1, wherein clearing data in the key data buffer if the triggered key is a Delete key comprises:

determining whether a duration of pressing the Delete key reaches a preset duration;
determining, in response to the duration of pressing the Delete key reaches the preset duration, whether data exist in the key data buffer;
displaying, in response to no data existing in the key data buffer, a menu interface, storing the system state identification as a menu function selection identification;
clearing, in response to data existing in the key data buffer, the key data buffer;
displaying, in response to the data existing in the key data buffer, a challenge code information input interface;
determining, in response to the duration of pressing the Delete key not reaching the preset duration, whether data exist in the key data buffer;
clearing, in response to data existing in the key data buffer, a last stored key value in the key data buffer; and
displaying the data in the key data buffer.

8. The method of claim 1, wherein the basic factor is a time factor, and the method further comprises:

updating, by the dynamic token and in response to detecting a timer interrupt, a time factor;
setting, by the dynamic token and in response to detecting the timer interrupt, a timer wake identification; and
in response to determining that the set wake identification is the timer wake identification:
determining, using the dynamic token, whether the system state identification is a Bluetooth OTP identification;
adding, in response to the system state identification being the Bluetooth OTP identification, 1 to a count value of a Bluetooth mode counter;
setting, in response to the system state identification not being the Bluetooth OTP identification, an initial count value of the Bluetooth mode counter to 0;
determining, using the dynamic token and in response to the system state identification being the Bluetooth OTP identification, whether the count value of the Bluetooth mode counter is less than a first preset value;
setting the count value of the Bluetooth mode counter to 0;

clearing the data receiving buffer;
powering off the Bluetooth module;
displaying a challenge code information input interface;
storing the system state identification as a challenge code input identification;
outputting, in response to the count value of the Bluetooth mode counter being less than a first present value and using an LCD screen, information corresponding to the work voltage being low and instructing an operator to recharge;
determining, using the dynamic token, whether the system state identification is a challenge code input identification;
adding, using the dynamic token and in response to (i) the system state identification not being the Bluetooth OTP identification and (ii) the system state identification being a challenge code input identification, 1 to a count value of a no-key-press counter, wherein an initial value of the no-key-press counter is 0;
determining, using the dynamic token, whether the count value of the no-key-press counter is less than a second preset value;
in response to the count value of the no-key-press counter not being less than the second preset value:
setting, using the dynamic token, the count value of the no-key-press counter to 0;
storing, using the dynamic token, the system state identification as a power-off identification; and
clearing, using the dynamic token, the key data buffer; and
resetting, using the dynamic token and in response to (i) the system state identification not being a challenge code input identification and (ii) the count value of the no-key-press counter being less than the second preset value, the timer wake identification.

9. The method of claim 1 further comprising, in response to the set wake identification being the Bluetooth connection wake identification:
setting, using the dynamic token, the Bluetooth module to a monitoring mode; and
resetting, using the dynamic token, a Bluetooth connection wake identification, wherein the Bluetooth connection wake identification is configured to be set by the dynamic token when the dynamic token detects a Bluetooth connection interrupt.

10. The method of claim 1 further comprising, in response to the set wake identification being the Bluetooth disconnection wake identification:
clearing, using the dynamic token, the data receiving buffer; and
resetting, using the dynamic token, a Bluetooth disconnection wake identification, wherein the Bluetooth disconnection wake identification is configured to be set by the dynamic token when the dynamic token detects a Bluetooth disconnection interrupt.

11. The method of claim 1 further comprising, in response to the set wake identification being the Bluetooth connection wake identification:
receiving, using the dynamic token, Bluetooth data;
storing, using the dynamic token, the Bluetooth data into a data receiving buffer;
setting, using the dynamic token, a Bluetooth data receiving completion identification; and
resetting, using the dynamic token, a Bluetooth data wake identification, wherein the Bluetooth data wake identification is configured to be set by the dynamic token when the dynamic token detects a Bluetooth data interrupt.

12. The method of claim 1 further comprising:
detecting a system state identification;
performing a menu function selection operation, wherein the menu function selection operation comprises:
detecting a key value;
in response to the key value corresponding to a value of an OK key, determining a selected function;
in response to the key value corresponding to a value of an else key, performing a corresponding operation based on the else key value, wherein the else key value includes a key value of a right key and a key value of a left key;
in response to a selection function corresponding to the Bluetooth OTP, (i) powering up the Bluetooth module, (ii) displaying a Bluetooth OTP interface, and (iii) storing the system state identification as a Bluetooth OTP identification;
reading a Bluetooth module parameter;
determining whether the reading the Bluetooth module parameter is successful;
in response to determining reading the Bluetooth parameter is successful, setting the Bluetooth module to a monitoring mode and quitting the menu function selection operation;
in response to determining reading the Bluetooth parameter is not successful, adding 1 to a number of times of reading a Bluetooth module parameter;
determining whether the number of the times of reading the Bluetooth module parameter reaches a sixth preset value; and
in response to the number of times of reading the Bluetooth parameter reaches the sixth preset value, providing a prompt that the Bluetooth module is broken.

13. A method comprising:
determining, by a dynamic token that is implemented by a microprogrammed control unit configured to execute instructions stored in a memory, a key value of a triggered key, wherein the key value of the triggered key is one of a power key, an OK key, and a Delete key;
determining, by the dynamic token and in response to the key value of the triggered key being the power key, a system state identification, wherein the system state identification is one of a power-off identification, a challenge code input identification, a Bluetooth OTP identification, and an else condition;
in response to the triggered key being the power key:
determining, using the dynamic token and in response to the system state identification being the power-off identification, whether a work voltage of a Bluetooth module is less than a preset voltage;
providing, in response to the work voltage of the Bluetooth module being lower than the preset voltage and the system state identification being the power-off identification, a prompt that the work voltage of the Bluetooth module is low; and
setting the Bluetooth module to a monitoring mode in response to the work voltage of the Bluetooth module not being lower than the preset voltage;
storing, in response to the system state identification not being a power-off identification, the system state identification as a power-off identification, clearing the data in the key data buffer, powering off the Bluetooth module, and the dynamic token sleeping;

in response to the system state identification being the
challenge code input identification and the triggered
key not being the power key:
storing, in response to the trigger key being a number
key, a number corresponding to the key value in a
key data buffer;
generating, in response to the trigger key being an OK
key, a dynamic factor based on at least one of data in
the key data buffer and a basic factor of the dynamic
token;
computing a dynamic password based on the dynamic
factor;
in response to the system state identification being the
Bluetooth OTP identification and the triggered key not
being the power key:
storing, in response to the triggered key being a number
key, the number corresponding to the key value in
the key data buffer;
determining, in response to the triggered key being an
OK key, whether a Bluetooth data receiving completion identification is set;
in response to the Bluetooth data receiving the completion identification being set:
generating a dynamic factor based on at least one of
the data in the data receiving buffer and the basic
factor of the dynamic token;
computing the dynamic password based on the
dynamic factor; and
returning the computed dynamic factor to an upper
computer; and
in response to the Bluetooth data receiving the completion identification not being set and data existing in
the key data buffer:
generating the dynamic factor based on at least one
of the data in the key data buffer and the basic
factor of the dynamic token as the dynamic factor;
computing the dynamic password according to the
dynamic factor; and
displaying the dynamic factor.

14. The method of claim 13, wherein:
returning the dynamic password to the upper computer
comprises at least one of displaying the dynamic password via a LCD screen and returning the dynamic
password to the upper computer via the Bluetooth
module.

15. The method of claim 13, wherein the basic factor
comprises at least one of a time factor and an event factor.

16. The method of claim 13 further comprising, in
response to the Bluetooth data receiving the completion
identification not being set and data existing in the key data
buffer:
generating the dynamic factor based on at least one of the
data in the data receiving buffer and the basic factor of
the dynamic token;
computing the dynamic password based on the dynamic
factor; and
returning the computed dynamic password to an upper
computer.

17. The method of claim 13 further comprising providing
power to the Bluetooth module in response to the work
voltage of the Bluetooth module not being lower than the
preset voltage.

18. The method of claim 13 further comprising:
storing the system state identification as a challenge code
input identification in response to the work voltage of
the Bluetooth module being lower than the preset
voltage for a first preset duration; and
storing the system state identification as a Bluetooth OTP
identification in response to the work voltage of the
Bluetooth module not being lower than the preset
voltage.

19. The method of claim 13, wherein determining whether
a work voltage of the Bluetooth module is lower than the
preset voltage further comprises performing a password
checking operation, wherein the password checking operation includes:
determining, by the dynamic token, the key value of the
triggered key;
in response to the triggered key being a number key and
a length of the key data is less than a preset length:
storing key data corresponding to the number key in the
key data buffer;
displaying a password checking interface; and
quitting the password checking operation;
in response to one of the triggered key not being a number
key and not being an OK key:
performing a corresponding operation based on the key
value of the triggered key; and
quitting the password checking operation;
determining, in response to the key value of the triggered
key being an OK key, whether the password in the key
data buffer is correct;
in response to the password in the key data buffer being
correct:
providing a prompt that the password is correct, clearing password failure times;
delaying a fourth preset time;
clearing the key data buffer; and
determining that the password is correct;
in response to the password in the key data buffer being
incorrect:
adding 1 to the number of the password failure times;
displaying a password failure interface;
delaying the fourth preset time;
determining, whether the number of the password
failure times is equal to a number of preset times;
in response to the number of password failure times being
equal to the number of preset times;
clearing the key data buffer;
in response to the number of the password failure times
not being equal to the number of preset times:
displaying the password interface; and
determining, in response to the password checking operation determining that the password is correct, whether
a work voltage of the Bluetooth module is lower than
a preset voltage.

20. The method of claim 13, wherein clearing the data in
the key data buffer if the triggered key is a Delete key,
comprises:
determining whether a duration of pressing the Delete key
reaches a preset duration;
determining, in response to the duration of pressing the
Delete key reaches the preset duration, whether data
exist in the key data buffer;
displaying, in response to data not existing in the key data
buffer, a menu interface,
storing, in response to data not existing in the key data
buffer, the system state identification as a menu function selection identification;
clearing, in response to data existing in the key data
buffer, the key data buffer;
displaying, in response to data existing in the key data
buffer, a challenge code information input interface;

determining, in response to the duration of pressing the Delete key not reaching the preset duration, whether data exist in the key data buffer;

clearing, in response to data existing in the key data buffer, a last stored key value in the key data buffer; and displaying the data in the key data buffer.

21. The method of claim 13, wherein the basic factor is a time factor, and the method further comprises:

updating, by the dynamic token and in response to detecting a timer interrupt, a time factor;

setting, by the dynamic token and in response to detecting the timer interrupt, a timer wake identification; and in response to determining that the set wake identification is the timer wake identification:

determining, using the dynamic token, whether the system state identification is a Bluetooth OTP identification;

adding, in response to the system state identification being the Bluetooth OTP identification, 1 to a count value of a Bluetooth mode counter;

setting, in response to the system state identification not being the Bluetooth OTP identification, an initial count value of the Bluetooth mode counter to 0;

determining, using the dynamic token and in response to the system state identification being the Bluetooth OTP identification, whether the count value of the Bluetooth mode counter is less than a first preset value;

setting the count value of the Bluetooth mode counter to 0;

clearing the data receiving buffer;

displaying a challenge code information input interface;

storing the system state identification as a challenge code input identification;

outputting, in response to the count value of the Bluetooth mode counter being less than a first present value and using an LCD screen, information corresponding to the work voltage being low and instructing an operator to recharge;

determining, using the dynamic token, whether the system state identification is a challenge code input identification; adding, using the dynamic token and in response to (i) the system state identification not being the Bluetooth OTP identification and (ii) the system state identification being a challenge code input identification, 1 to a count value of a no-key-press counter, wherein an initial value of the no-key-press counter is 0;

determining, using the dynamic token, whether the count value of the no-key-press counter is less than a second preset value;

in response to the count value of the no-key-press counter not being less than the second preset value:

setting, using the dynamic token, the count value of the no-key-press counter to 0;

storing, using the dynamic token, the system state identification as a power-off identification; and clearing, using the dynamic token, the key data buffer; and resetting, using the dynamic token and in response to (i) the system state identification not being a challenge code input identification and (ii) the count value of the no-key-press counter being less than the second preset value, the timer wake identification.

22. The method of claim 13 further comprising:

in response to the dynamic token detecting a Bluetooth data interrupt:

receiving the Bluetooth data;

storing the Bluetooth data in the data receiving buffer; and setting a Bluetooth data receiving completion identification;

in response to the dynamic token detecting a Bluetooth connection interrupt:

displaying that Bluetooth is connected; and clearing a screen after a preset time; and in response to the dynamic token detecting a Bluetooth disconnection interrupt:

clearing the data receiving buffer.

23. The method of claim 13 further comprising:

detecting a system state identification;

performing a menu function selection operation, wherein the menu function selection operation comprises:

detecting a key value;

in response to the key value corresponding to a value of an OK key, determining a selected function;

in response to the key value corresponding to a value of an else key, performing a corresponding operation based on the else key value, wherein the else key value includes a key value of a right key and a key value of a left key;

in response to a selection function corresponding to the Bluetooth OTP, (i) powering up the Bluetooth module, (ii) displaying a Bluetooth OTP interface, and (iii) storing the system state identification as a Bluetooth OTP identification;

reading a Bluetooth module parameter;

determining whether the reading the Bluetooth module parameter is successful;

in response to determining reading the Bluetooth parameter is successful, switching the Bluetooth module into a monitoring mode and quitting the menu function selection operation;

in response to determining reading the Bluetooth parameter is not successful, adding 1 to a number of times of reading a Bluetooth module parameter;

determining whether the number of the times of reading the Bluetooth module parameter reaches a sixth preset value; and in response to the number of times of reading the Bluetooth parameter reaches the sixth preset value, providing a prompt that the Bluetooth module is broken.

\* \* \* \* \*